(12) United States Patent
Quehenberger

(10) Patent No.: US 7,690,490 B2
(45) Date of Patent: Apr. 6, 2010

(54) FRICTION CLUTCH AND ACTUATOR THEREOF

(75) Inventor: Johannes Quehenberger, Saalbach Hinterglemm (AT)

(73) Assignee: Magna Steyr Powertrain AG & Co KG, Lannach (AT)

( * ) Notice: Subject to any disclaimer, the term of this patent is extended or adjusted under 35 U.S.C. 154(b) by 840 days.

(21) Appl. No.: 10/558,030

(22) PCT Filed: May 21, 2004

(86) PCT No.: PCT/AT2004/000178

§ 371 (c)(1),
(2), (4) Date: Oct. 18, 2006

(87) PCT Pub. No.: WO2004/104443

PCT Pub. Date: Dec. 2, 2004

(65) Prior Publication Data

US 2007/0199791 A1 Aug. 30, 2007

(30) Foreign Application Priority Data

May 23, 2003 (AT) ............................ GM 359/2003

(51) Int. Cl.
*F16D 28/00* (2006.01)
*F16D 23/12* (2006.01)
(52) U.S. Cl. .................. 192/84.6; 192/30 W; 192/84.7; 192/93 A
(58) Field of Classification Search .............. 192/70.23, 192/84.6, 84.7, 30 W
See application file for complete search history.

(56) References Cited

U.S. PATENT DOCUMENTS

| 3,791,501 | A | 2/1974 | Culbertson |
| 4,976,347 | A | 12/1990 | Sakakibara et al. |
| 5,024,638 | A | 6/1991 | Sakakibara et al. |
| 5,106,349 | A | 4/1992 | Botterill et al. |
| 5,752,373 | A | 5/1998 | Cappo et al. |
| 6,651,793 | B2 | 11/2003 | Reisinger |
| 6,802,794 | B2 * | 10/2004 | Showalter .................... 475/269 |
| 6,835,156 | B2 | 12/2004 | Lippitsch |
| 7,086,976 | B2 * | 8/2006 | Stevenson ....................... 475/2 |
| 2001/0030099 | A1 * | 10/2001 | Fliege ....................... 192/91 A |
| 2002/0088683 | A1 | 7/2002 | Nestler et al. |

(Continued)

FOREIGN PATENT DOCUMENTS

DE 4140122 6/1993

(Continued)

*Primary Examiner*—Rodney H Bonck
*Assistant Examiner*—Erin D Bishop
(74) *Attorney, Agent, or Firm*—Harness, Dickey & Pierce, P.L.C.

(57) ABSTRACT

The invention relates to a friction clutch consisting of primary and secondary disks and a pressure plate. The clutch also includes an actuator with two coaxial rings that can be rotated independent of one another. The rings compress the disks during relative rotation. In order to provide an actuator which operates accurately and with zero loss, an electric motor having at least one drive wheel is provided for the relative rotation of both rings. The drive wheel is drivingly connected to the two rings by a traction means. Two chains of the traction means lead from the drive wheel to the rotatable rings, wherein the ends of the chains are fixed to their corresponding ring, and the two rings have different diameters.

15 Claims, 3 Drawing Sheets

U.S. PATENT DOCUMENTS

Figure 6:
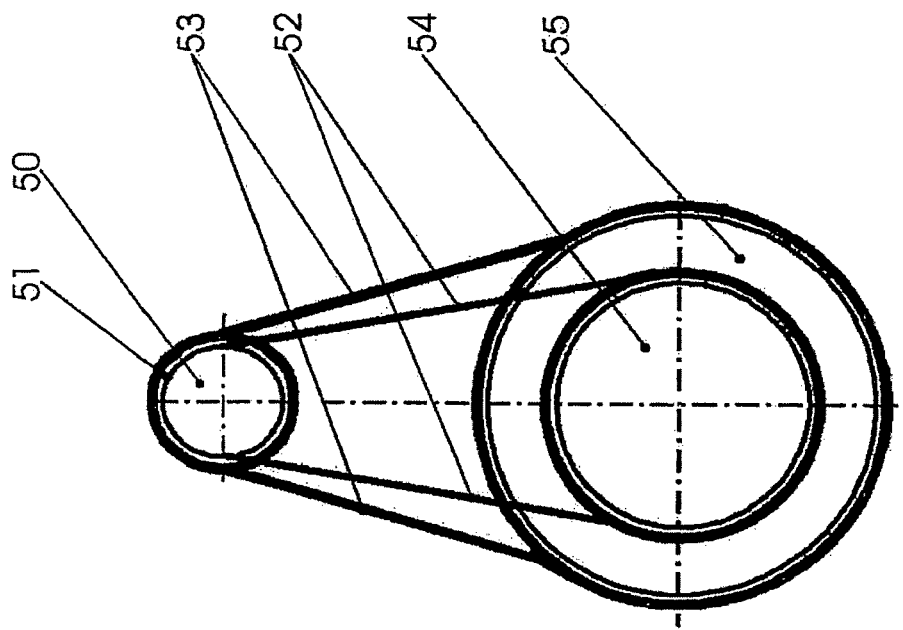

2003/0029690 A1 * 2/2003 Reisinger .................. 192/84.7

FOREIGN PATENT DOCUMENTS

| FR | 1 361 098 A | 5/1964 |
| JP | 61-096223 A | 5/1986 |
| JP | 01153841 | 6/1989 |
| WO | WO-01/59331 | 8/2001 |
| WO | WO 03/025422 A | 3/2003 |

* cited by examiner

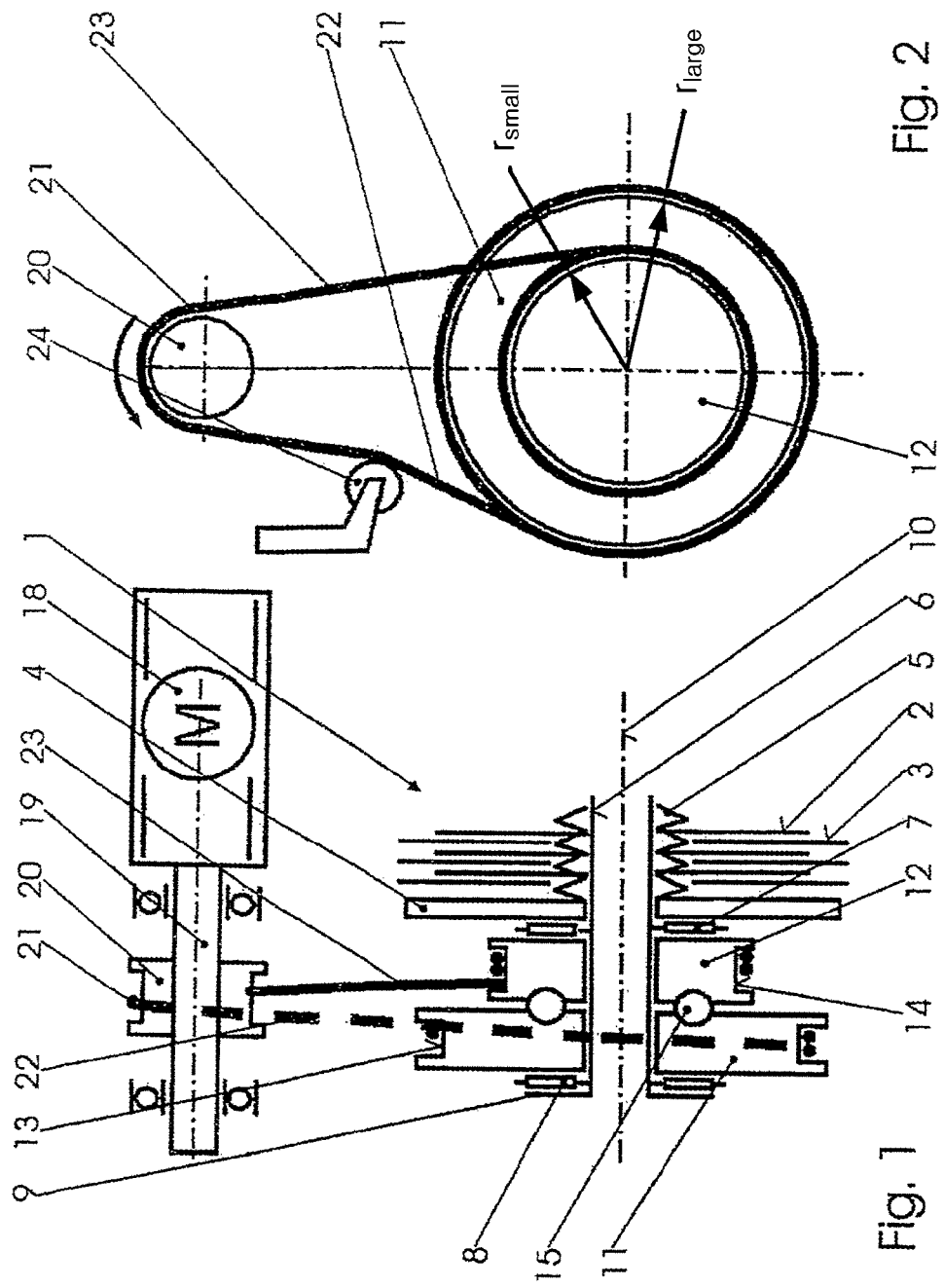

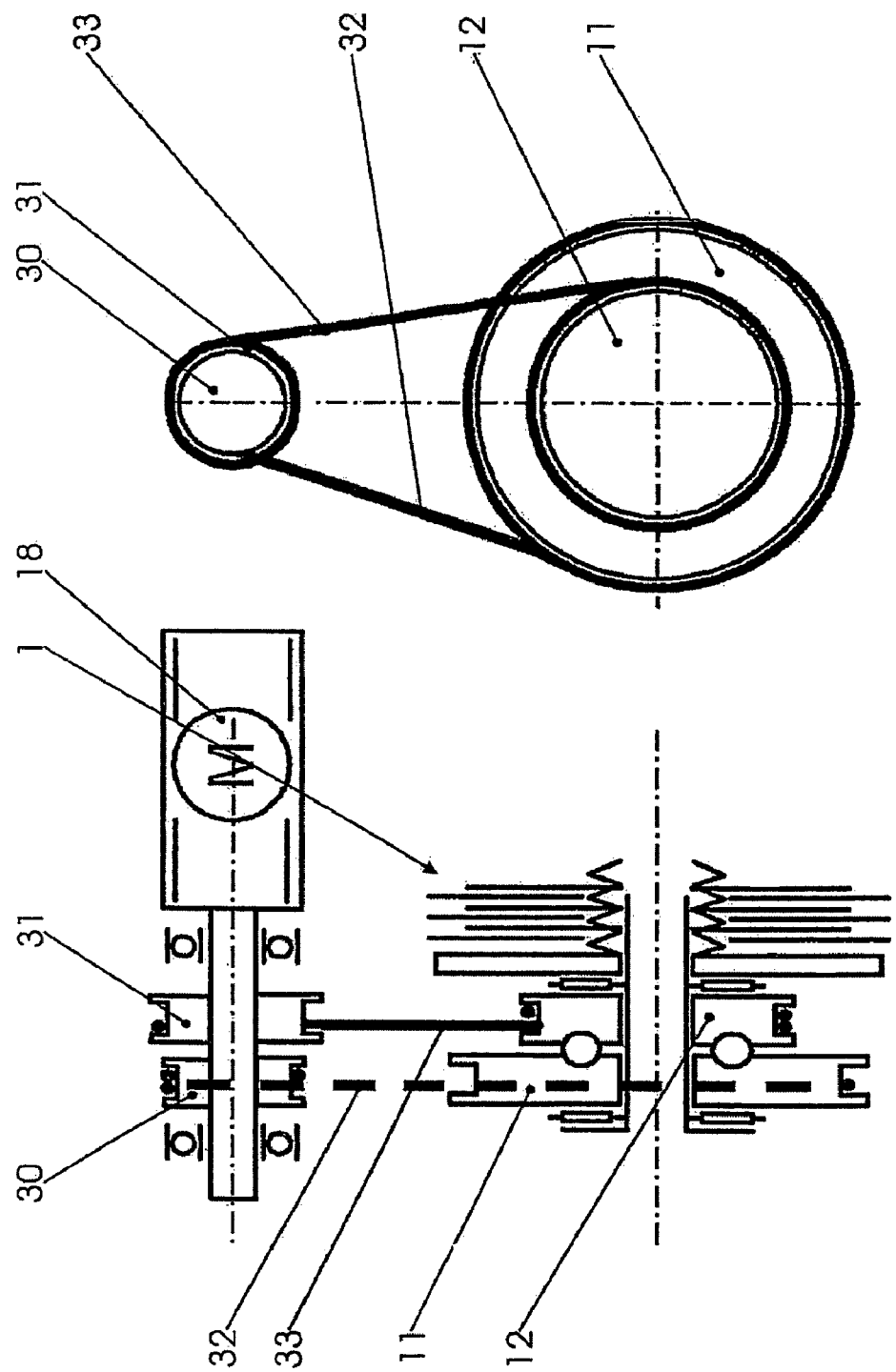

FRICTION CLUTCH AND ACTUATOR THEREOF

CROSS-REFERENCE TO RELATED APPLICATIONS

This application is a National Stage of International Application No. PCT/AT04/00178, filed May 21, 2004. This application claims the benefit of Austrian patent application no. GM 359/2003, filed May 23, 2003. The disclosures of the above applications are incorporated herein by reference in their entirety.

FIELD

The present teachings relate to friction clutches with an actuator. The friction clutch has, coaxially, primary and secondary disks and a pressure plate. The actuator has two coaxial rings that are rotatable independently of each other. The first ring, supported in an axial direction and by at least one threaded surface, is operatively connected with the second ring so that during relative rotation of the two rings the pressure plate is axially displaced against the force of a spring, thus pressing the disks together.

BACKGROUND

The statements in this section merely provide background information related to the present disclosure and may not constitute prior art.

Clutches find use in the drive train of motor vehicles for the purpose of controlling the locking ratio of differentials or for adjusting the torque distribution between two driven axles. This requires a very accurate and reproducible adjustment of the torque that is to be transmitted by the clutch. The clutch must be capable of being disengaged very quickly (brakes with ABS) or it must disengage itself (in case of control failure); it must be also able to be engaged quickly and to be held in one position. In addition, the actuator should be able to apply the considerable force needed to press the disks together while weighing as little as possible and occupying a small mounting space.

A clutch of this kind is described in WO 01/59331 A1. In this clutch, the rotatable rings carry levers, the ends of which ride on a rotatable control disk driven by a geared electric motor at a high gear ratio. Because of the plays and frictional losses in the geared motor that can lead to self-locking which would render fast disengagement impossible and, furthermore, because of the high cost, high weight, and difficult installation, this approach is unsatisfactory.

Moreover, it is known from U.S. Pat. No. 4,976,347 to provide each of the two rotatable rings with a toothed gear which meshes with a toothed gear on the motor shaft. With a slight difference in tooth number, it is possible to achieve a high gear ratio without the clutch having its own speed reduction gear. In this manner, however, considerable frictional losses arise in the gear tooth system which can lead to self-locking. Such locking must be prevented, however, if in the event of control failure the clutch is to release itself. In the event of fast actuation, shocks occur which raise the load on and wear of the actuator as a result of the peculiarities of the gear tooth system (i.e., backlash and resistance to rotation of the system). The friction not only causes an energy loss, but it also makes it more difficult to adjust the torque to be transmitted by measuring and controlling the motor current. The design of the gear tooth system is difficult to reconcile with the installation requirements.

Hence, it is desirable to provide an actuator which operates as accurately and friction-free as possible, and which at a lower cost and reduced weight can readily be accommodated in a housing.

SUMMARY

According to the present teachings, this object is reached by providing, for the rotation of the two rings, an electric motor with at least one drive wheel which by drawing means is (are) drivingly connected with the two rings. By the phrase drawing means is meant any transmission means that transmits drawing forces, for example a chain, cable, belt etc. The drawing means not only weighs less and is less expensive than a gear tooth system, but it also considerably reduces frictional losses (hence, there is no self-locking), especially in the case of the high gear ratio between a high-speed electric motor and the slow relative rotation between the two rings which according to the prior art would require multistage or worm gearing.

In the ABS case, this results in fast and reliable opening of the clutch, and in the event of control failure, it results in a reproducible adjustment of the torque to be transmitted. In addition, the traction belt can be configured so that it attenuates shocks. Another advantage of the drawing means lies in that the axles of both wheels (drive wheel and ring) do not have to be parallel. They can also be skewed and positioned at any distance from one another. This results in great flexibility in designing and mounting the actuator, particularly the motor, in/on the housing of the clutch.

In a preferred embodiment, there is provided on the electric motor a drive wheel from which two parts of the traction means lead to the rotatable rings, namely one part to the first ring and the other part to the second ring. The ends of the parts are fastened to their corresponding ring, and the two rings having different diameters. In other words, the traction means is not closed, but is of finite length and can even wrap itself around the ring and/or the driving roller several times. Thus, the two rings rotate at different speeds, but in the same direction. Only the difference in the speed of rotation causes the clutch to engage or disengage. The traction means is kept under tension by the springs in the clutch, because the two rings have a tendency to rotate in opposite directions via the at least one threaded surface. In other words, the traction means need not be provided with its own tensioning system.

In another embodiment, each of the two rings is drivingly connected by means of its own traction means with the at least one drive wheel. The ends of the traction means are fastened to their corresponding ring and to the drive wheel, and the two rings and/or the drive wheel have different diameters. Because of the bilateral fastening, no slipping is possible between the traction means and its pinion. Due to the clutch spring, both traction means remain under tension.

In another embodiment, each of the two rings is drivingly connected by its own closed traction means with the at least one drive wheel, and the two rings and/or the drive wheel have different diameters. In this manner, there exist two wraparound traction means between which the actuation forces are distributed.

There are several advantageous forms of the traction means, depending on requirements and the selected embodiment. In the case of a transmission belt, the damping properties are most important. A cable, particularly a wire rope, can be wound in adjacent lays onto the drive wheel or onto the rings, as well as onto a drum. This results in unusually high speeds of rotation and thus smooth operation and very small forces in the traction means at a high resulting force (e.g., a hoist).

Several fabrication designs are also possible for the at least one threaded surface acting between the first ring and the second ring. This surface could be a thread-like groove with balls. Preferably, at least one of the rotatable rings has on the side facing the other ring at least two ramps rising axially in the circumferential direction and cooperating with a rolling element. This provides a maximum of design flexibility for the slope of the ramp which permits a distribution of the total speed reduction between the electric motor and the axial movement of the clutch disks among the various transmission members and makes it possible to provide them with, for example, ramp-like grooves.

Due to the arrangement according to the present teachings, many possibilities exist for controlling the motor so as to have the clutch transmit a certain torque. This can be done via the electric current of the motor. It can also be done via the traction force of the traction means. This force can be determined quite easily by assigning to the traction means a force sensor that emits signals corresponding to the pressing force exerted by the pressure plate (4).

Further areas of applicability will become apparent from the description provided herein. It should be understood that the description and specific examples are intended for purposes of illustration only and are not intended to limit the scope of the present disclosure.

DRAWINGS

Figure 5:
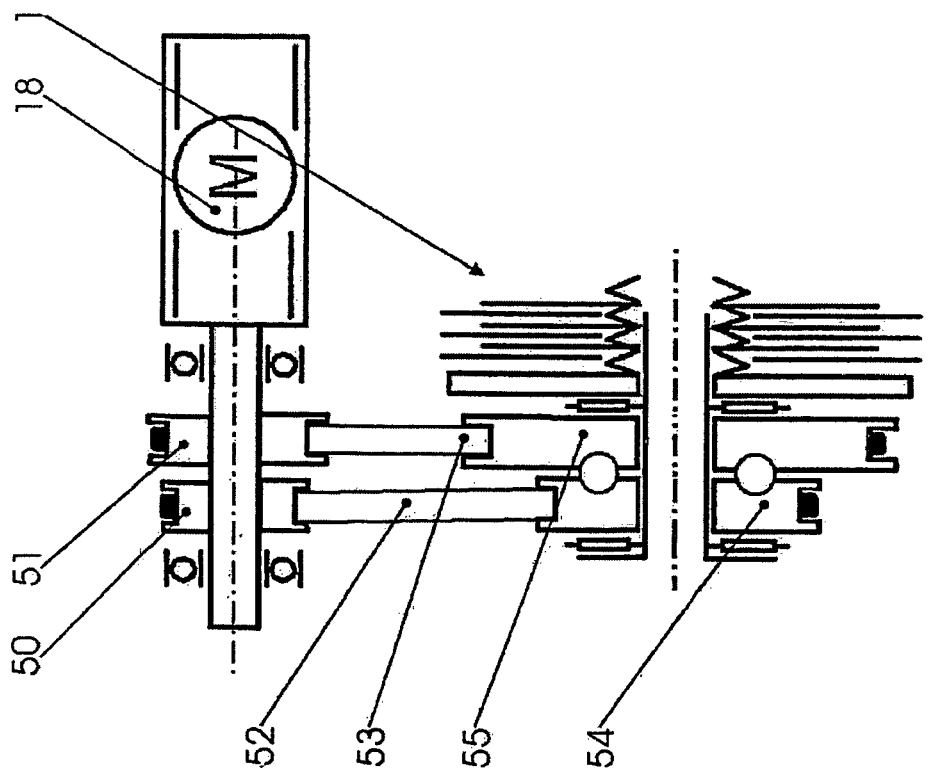

In the following, the invention will be described and explained by way of drawings of which:

FIG. 1 is a schematic view showing a longitudinal section of the clutch of the present teachings, in a first embodiment, FIG. 2 is a cross-section corresponding to FIG. 1, FIG. 3 a view of a clutch as in FIG. 1, but in a second embodiment, FIG. 4 is a cross-section corresponding to FIG. 3, FIG. 5 a view of a clutch as in FIG. 1, in a third embodiment, and FIG. 6 is a cross-section corresponding to FIG. 5.

DETAILED DESCRIPTION

The following description is merely exemplary in nature and is not intended to limit the present disclosure, application, or uses.

In FIGS. 1 and 2, a friction clutch 1 is only partly shown. The clutch 1 contains alternating inner disks 2 and outer disks 3 and a pressure plate 4 that presses together disks 2, and 3 against a stop (not shown) by overcoming the force of the clutch springs 5, thus engaging the clutch 1. The stop is, for example, part of a housing (also not shown) wherein the outer disks 3 are disposed in a rotation-resisting manner. The housing may be the primary part of the clutch 1 and a shaft 6 the secondary part. Here, clutch springs 5 are shown as disk springs, but they could be any other kind of spring or disposed in any other manner. At any rate, the springs 5 are intended to separate clutch disks 2, and 3 from one another, namely to release the clutch 1.

On shaft 6, and freely rotatable thereabout, there are provided a first rotatable ring 11 and a second rotatable ring 12. The first ring 11 is supported by an axial bearing 8 on a collar 9 of shaft 6, and the second ring 12 is supported by an axial bearing 7 on the pressure plate 4 which is displaceable in the axial direction. Between the two rings 11 and 12 can be seen balls 15 running in a circumferential direction in circumferential grooves that constitute the ramps. In this manner, during relative rotation between rings 11 and 12, the second ring 12 is moved in the direction of the clutch engagement (in FIG. 1 to the right). Various designs are known for the arrangement of grooves and rolling elements. The conversion of the relative rotation between the two rings 11 and 12 into an axial movement of the second ring 12 can, according to the present teachings, also be accomplished in another way, for example by means of screw-shaped grooves with rolling elements disposed between them, in the manner of a ball screw.

Engagement surfaces 13 and 14 for the traction means 21 are provided on the outer circumference of first ring 11 and second ring 12. The gear ratio between the number of rotations of the motor and the relative rotation of the rings is determined by the choice of the radius of the engagement surfaces 13 and 14 and of the drive wheel 20. From an electric motor 18, which is provided on the back side of rotation axis 10, there extends a motor shaft 19 with a drive wheel 20 resting thereon in rotation-resistant manner. Because no speed reduction gears are provided between motor 18 and drive wheel 20, the drive wheel 20 rotates at the same speed as the motor 18. By a traction means 21, drive wheel 20 is drivingly connected with the two rings 11 and 12. Here, traction means 21 is a cable, or a wire rope, consisting of two parts 22 and 23 of which the first part 22 leads to the engagement surface 13 on the first ring 11, winds around it at a certain arc length or by forming several lays and finally with its end is fastened to first ring 11. The fastening is not shown. In a similar manner, second part 23 runs from drive wheel 20 to engagement surface 14 of second ring 12, the radius, $r_{small}$, of which is smaller than that of engagement surface 13, $r_{large}$, on the first ring 11.

Because of the difference in the radii of the two engagement surfaces 13 and 14 and in the winding-around directions, the two rings 11 and 12 here rotate in the same direction, but at different speeds. By an appropriate selection of the radii of the two engagement surfaces 13 and 14, it is possible to achieve a very small difference in speed of rotation between the two rings 11 and 12 and thus very high force transmission at very low frictional losses despite the fact that the speed of rotation of the two rings 11 and 12 is still very high. The frictional losses are so low that the force of the clutch springs 5 is sufficient to create a torque between the two rings 11 and 12 a torque which keeps the first cable part 22 under tension in the direction of rotation A of drive wheel 20 indicated in FIG. 2. Finally, also indicated is a force sensor 24, which in the case of the preferred control method for electric motor 18, namely via the current it absorbs, however, is superfluous.

The embodiment shown in FIGS. 3 and 4 differs from the preceding one in that in place of a single drive wheel 20 there is provided a first drive wheel 30 and a second drive wheel 31 each of which is connected with rings 11 and 12 by its own traction means 32 and 33. In other words, there are two traction means 32 and 33 each of which by its two ends is fastened to the corresponding drive wheel 30 and 31 and corresponding ring 11 and 12.

The embodiment shown in FIGS. 5 and 6 differs from that of FIG. 3 in that the two traction means 52 and 53 have closed run-around belts (for example transmission belts) which drivingly connect each of the two drive wheels 50 and 51 with the corresponding ring 54 and 55 in a manner of a common trans-mission belt.

What is claimed is:

1. A friction clutch comprising:
   a primary disk, a secondary disk, and a pressure plate;
   an actuator including first and second coaxial rings being rotatable independently of each other, the first coaxial ring being restricted from movement in an axial direction and being operatively connected with the second coaxial ring so that the second ring, during relative rotation of the coaxial rings, axially displaces the pressure plate to press the primary and secondary disks together, an electric motor with a drive wheel; and a flexible member drivingly engaging the drive wheel, the first ring and the second ring, wherein the coaxial rings are rotated by the flexible member and driven by the electric motor with the drive wheel.

2. The friction clutch as defined in claim 1, wherein the flexible member includes a first part and a second part, the first part being fastened to the first coaxial ring and the second part being fastened to the second coaxial ring.

3. The friction clutch as defined in claim 1, wherein the flexible member includes an end that is fastened to one of the first coaxial ring, the second coaxial ring and the drive wheel.

4. The friction clutch as defined in claim 1, wherein the flexible member is a cable having a finite length.

5. The friction clutch as defined in claim 1, wherein at least one of the coaxial rings has, on a side facing the other ring, at least two ramps axially rising in a circumferential direction that cooperate with a rolling element.

6. The friction clutch as defined in claim 1, further including a sensor that emits a signal corresponding to a pressing force of the pressure plate.

7. The friction clutch as defined in claim 1, wherein the first and second coaxial rings include different driven diameters.

8. The friction clutch as defined in claim 1 wherein the flexible member is wound around one of the drive wheel, the first ring and the second ring multiple times.

9. A friction clutch comprising:

an inner disk, an outer disk and a pressure plate;

a first rotatable ring and a second rotatable ring each including a circumferential groove, the first rotatable ring and the second rotatable ring being separated by at least one rolling element disposed in the circumferential grooves;

a drive wheel; and a wire rope engaged with the drive wheel and having an end fixed to one of the first and second rotatable rings.

10. The friction clutch of claim 9, wherein the first and second rotatable rings include portions having different diameters that are engaged by the wire rope.

11. The friction clutch of claim 9, further comprising another drive wheel and another wire rope, the another wire rope being engaged with the another drive wheel and the other of the first and second rotatable rings.

12. The friction clutch of claim 11, wherein a diameter of the drive wheel driving the wire rope is different than a diameter of the another drive wheel.

13. The friction clutch of claim 9, wherein the drive wheel is driven by a motor.

14. The friction clutch of claim 9, further comprising a sensor that detects a pressing force of the pressure plate.

15. The friction clutch of claim 9, wherein the wire rope is wound around one of the drive wheel, the first ring and the second ring multiple times.

* * * * *